(12) United States Patent
Shiao et al.

(10) Patent No.: US 12,189,758 B2
(45) Date of Patent: Jan. 7, 2025

(54) SECURING CRITICAL DATA IN A STORAGE DEVICE OF A COMPUTER SYSTEM

(71) Applicant: Super Micro Computer, Inc., San Jose, CA (US)

(72) Inventors: Rsong-Hsiang Shiao, San Jose, CA (US); Hung-Ming Chien, Taoyuan (TW)

(73) Assignee: Super Micro Computer, Inc., San Jose, CA (US)

( * ) Notice: Subject to any disclaimer, the term of this patent is extended or adjusted under 35 U.S.C. 154(b) by 279 days.

(21) Appl. No.: 17/962,325

(22) Filed: Oct. 7, 2022

(65) Prior Publication Data

US 2024/0119139 A1 Apr. 11, 2024

(51) Int. Cl.
  *G06F 21/53* (2013.01)
  *G06F 21/62* (2013.01)

(52) U.S. Cl.
  CPC .......... *G06F 21/53* (2013.01); *G06F 21/6245* (2013.01); *G06F 2221/034* (2013.01)

(58) Field of Classification Search
  CPC . G06F 21/53; G06F 21/6245; G06F 2221/034
  See application file for complete search history.

(56) References Cited

U.S. PATENT DOCUMENTS

| | | | |
|---|---|---|---|
| 2013/0145475 A1* | 6/2013 | Ryu | G06F 21/31 726/26 |
| 2019/0114428 A1* | 4/2019 | Kim | H04L 9/321 |
| 2021/0110043 A1* | 4/2021 | Berger | G06F 12/1081 |
| 2021/0319117 A1* | 10/2021 | Willemse | H04L 9/3213 |

OTHER PUBLICATIONS

Thornton, Scott, "Arm TrustZone explained", https://www.microcontrollertips.com/embedded-security-brief-arm-trustzone-explained/, Dec. 28, 2017.
ARM Instruction Set, ARM DDI 0084D, https://iitd-plos.github.io/col718/ref/arm-instructionset.pdf, p. 4-1 through 4-60, downloaded Aug. 18, 2022.
"The TrustZone hardware architecture", Arm Limited, https://developer.arm.com/documentation/100935/0100/The-TrustZone-hardware-architecture- , downloaded Sep. 12, 2022, Copyright 1995-2022.
Ngabonziza, Bernard, "TrustZone Explained: Architectural Features and Use Cases", 2016 IEEE $2^{nd}$ International Conference on Collaboration and Internet Computing, DOI 10.1109/CIC.2016.63, p. 445-451, 2016.
"Universal Flash Storage", Wikipedia, https://en.wikipedia.org/wiki/Universal_Flash_Storage, last edited Aug. 20, 2022.
Felton, Don, "What is TrustZone?", https://www.trustonic.com/technical-articles/what-is-trustzone/, Trustonic, Jul. 3, 2019.

* cited by examiner

*Primary Examiner* — Ayoub Alata
(74) *Attorney, Agent, or Firm* — Beyer Law Group LLP

(57) ABSTRACT

A computer system includes a processor that operates in a normal world and a secure world and that provides hardware-level isolation between the normal world and the secure world. A storage device of the computer system has a protected data region that stores critical data. A random-access memory of the computer system has a normal memory space that is accessible in the normal world and a secure memory space that is accessible only in the secure world. The secure memory space stores commands that transfer the critical data between the protected data region and the normal memory space by direct memory access.

15 Claims, 5 Drawing Sheets

SECURING CRITICAL DATA IN A STORAGE DEVICE OF A COMPUTER SYSTEM

TECHNICAL FIELD

The present disclosure is directed to computer systems storage and security.

BACKGROUND

As its name indicates, critical data is data that is critical to the operation and functionality of a computer system. An example critical data is platform firmware, which comprises data needed to boot and operate a computer system. The National Institute of Standards and Technology document NIST-800-193 provides platform firmware resiliency guidelines. Ideally, platform firmware is stored in a storage device with security provisions that comply with the NIST-800-193 guidelines.

Universal Flash Storage (UFS) is a storage specification for flash storage devices. UFS is aimed to provide a universal storage interface for both embedded and removable flash memory based storage in mobile devices, such as smart phones and tablets. UFS devices, i.e., flash storage devices that comply with the UFS specification, provide reliable, high-speed data storage. However, platform firmware stored in UFS devices does not meet the NIST-800-193 guidelines without having to provide security monitoring and control that may slow access to the platform firmware. This limits storage of platform firmware in legacy flash storage devices, such as SPI NOR flash memories.

BRIEF SUMMARY

In one embodiment, a method is provided for securing critical data in a storage device of a computer system. The computer system includes a system on a chip (SOC) with a Reduced Instruction Set Computer (RISC) processor core that operates in a normal world and a secure world, the RISC processor core providing hardware-level isolation between the normal world and the secure world. The method includes creating a protected data region in an external storage device that is external to the SOC. The critical data is stored in the protected data region, which is only accessible to authorized programs. To access the critical data, a secure monitor call is made from the normal world to the secure world, the normal world being a rich execution environment (REE) of the computer system. In response to and in accordance with the secure monitor call, a direct memory access (DMA) operation is performed in the secure world to transfer the critical data from the protected data region of the external storage device to a normal memory space in an external random-access memory (RAM) of the computer system. The normal memory space is in the normal world, and the external RAM is external to the SOC.

In another embodiment, a computer system includes a Reduced Instruction set Computer (RISC) processor that is connected to a system bus, a storage host interface controller (SHIC) that is connected to the system bus, a dynamic random-access memory (DRAM) that is connected to the system bus, and a storage device that is connected to the SHIC. The RISC processor operates in a normal world and a secure world, the RISC processor providing hardware-level isolation between the normal world and the secure world. The storage device has a regular data region and a protected data region that are accessible by way of storage command pools. Critical data is stored in the protected data region, which is only accessible to authorized programs. The DRAM has a normal memory space accessible in the normal world and a secure memory space that is accessible only in the secure world. The secure memory space of the DRAM stores the storage command pools, which comprise commands for transferring the critical data between the protected data region and the normal memory space by direct memory access (DMA).

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
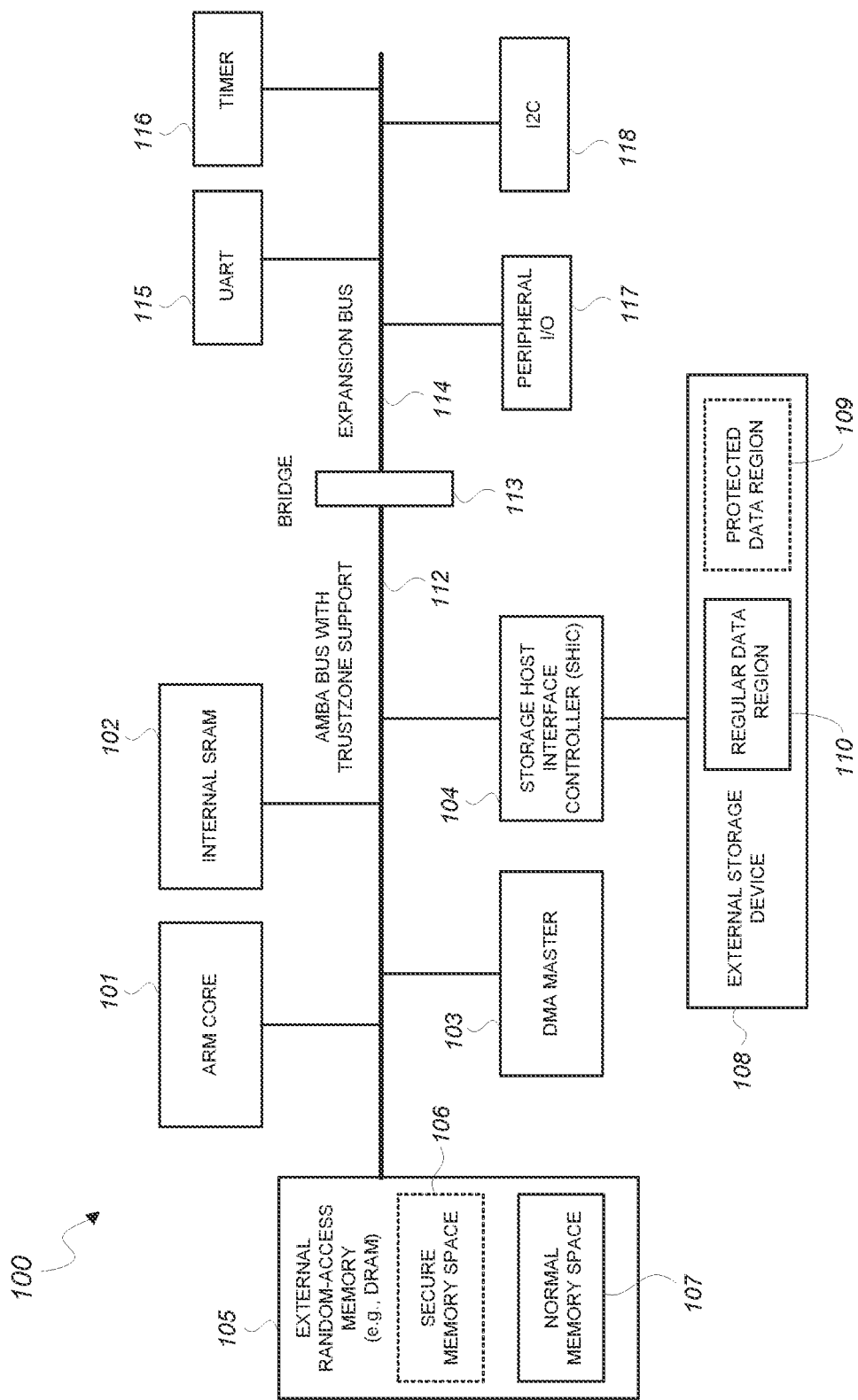
FIG. 1 shows a logical diagram of a computer system in accordance with an embodiment of the present invention.

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Compared to a Complex Instruction Set Computer (CISC) processor, e.g., an x86 processor, a Reduced Instruction Set Computer (RISC) processor has fewer and simpler instructions. This allows a RISC processor to execute instructions faster than a CISC processor. ARM is a family of RISC processors that are commercially available as processor cores in system on a chip (SOC) devices and are capable of operating in a normal world and a secure world, with the normal world being a Rich Execution Environment (REE) and the secure world being a Trusted Execution Environment (TEE).

As is well known, a REE is a normal environment for executing programs. The main operating system (OS) and other normal programs of a computer system run in the REE. In marked contrast to a REE, a TEE is a secure environment for executing programs. Programs and devices (e.g., peripherals and memory) running in the TEE are trusted, i.e., presumed to be trustworthy.

The ARM architecture with TRUSTZONE technology allows for two execution states, namely a normal world and a secure world. The normal world is a REE, whereas the secure world is a TEE. An ARM processor core can operate in the normal world and the secure world in a time slice fashion. Normal programs and devices, i.e., those in the normal world, cannot access devices in the secure world. That is, the ARM processor core provides hardware-level isolation between the normal world and the secure world. More particularly, normal programs cannot access memory locations and internal devices in the secure world. Although the TRUSTZONE technology could be extended to external memory devices (e.g., DRAM), the TRUSTZONE technology could not be applied to external storage devices (e.g., Flash, eMMC, and UFS devices).

In the TRUSTZONE technology, the memory system is divided by an extra bit that accompanies the physical address of peripherals and memory. This bit, called the NS-bit, indicates whether the access is secure or non-secure. The NS-bit bit is added to all memory system transactions, including cache tags and access to system memory and peripherals. The NS-bit can give a different physical address space for the secure and the normal worlds. Programs running in the normal world can only make non-secure accesses to memory, because the core always sets the NS bit to 1 in any memory transaction that is generated by the normal world. Programs running in the secure world usually makes only secure memory accesses, but can also make non-secure accesses for specific memory mappings.

As will be more apparent below, embodiments of the present invention allow critical data, such as platform firmware, to be stored in a protected data region of an external storage device that has an associated storage driver running in the normal world. To protect the critical data from unauthorized programs in the normal world, commands for accessing the protected data region are stored in memory locations in the secure world. In the secure world, access to the protected data region is validated to ensure that only authorized programs can access the protected data region. In one embodiment, data transfer to and from the protected data region is done by direct memory access (DMA) in the secure world, thus obviating the need for a storage driver for the storage device in the secure world. Embodiments of the present invention allow for secure and relatively fast data transfer of critical data in storage devices that have no integral security provision, such as UFS devices.

Embodiments of the present invention are described in the context of the ARM architecture for illustration purposes. Those skilled in the art will appreciate that embodiments of the present invention are equally applicable to other processor architectures that allow for operation in a normal world and a secure world, with hardware-level isolation between the normal and secure worlds.

Referring now to FIG. 1, there is shown a logical diagram of a computer system 100 in accordance with an embodiment of the present invention. In the example of FIG. 1, the computer system 100 comprises a system on a chip (SOC) (see FIG. 3, 310) that has an ARM processor core 101, a static random-access memory (SRAM) 102, a DMA master 103, and a storage host interface controller (SHIC) 104. Devices that are integrated in the SOC, such as the processor core 101, SRAM 102, DMA master 103, and SHIC 104, are also referred to herein as "internal" devices. The processor core 101, SRAM 102, DMA master 103, and SHIC 104 and other internal devices are connected to and communicate over a system bus 112, which in the example of FIG. 1 is an Advanced Microcontroller Bus Architecture (AMBA) bus that supports the ARM TRUSTZONE technology.

An external storage device 108 is connected to and is controlled by the SHIC 104. The external storage device 108 has a regular data region 110 and a protected data region 109. The protected data region 109 and the regular data region 110 are accessible by way of command pools that are stored in the secure world. In the secure world, access to the protected data region 109 is validated to control access to the protected data region 109. In one embodiment, the external storage device 108 is a UFS device, such as a flash memory device that is compliant with the UFS 3.1 and later specification.

An external random-access memory (RAM) 105 is connected to and communicates over the system bus 112. The external RAM 105 has a secure memory space 106 and a normal memory space 107. The secure memory space 106 comprises memory locations in the secure world, whereas the normal memory space 107 comprises memory locations in the normal world. In one embodiment, the external RAM 105 is high-speed memory, such as a dynamic random-access memory (DRAM). The external RAM 105 and the external storage device 108 are "external" devices in that they are not integrated with the SOC that contains the processor core 101, SRAM 102, DMA master 103, and SHIC 104.

In the example of FIG. 1, a bridge 113 connects the system bus 112 to an expansion bus 114. A Universal Asynchronous Receiver/Transmitter (UART) 115, timer 116, peripheral input/output controller 117, I2C controller 118, and other devices may be connected to the expansion bus 114.

Figure 2:
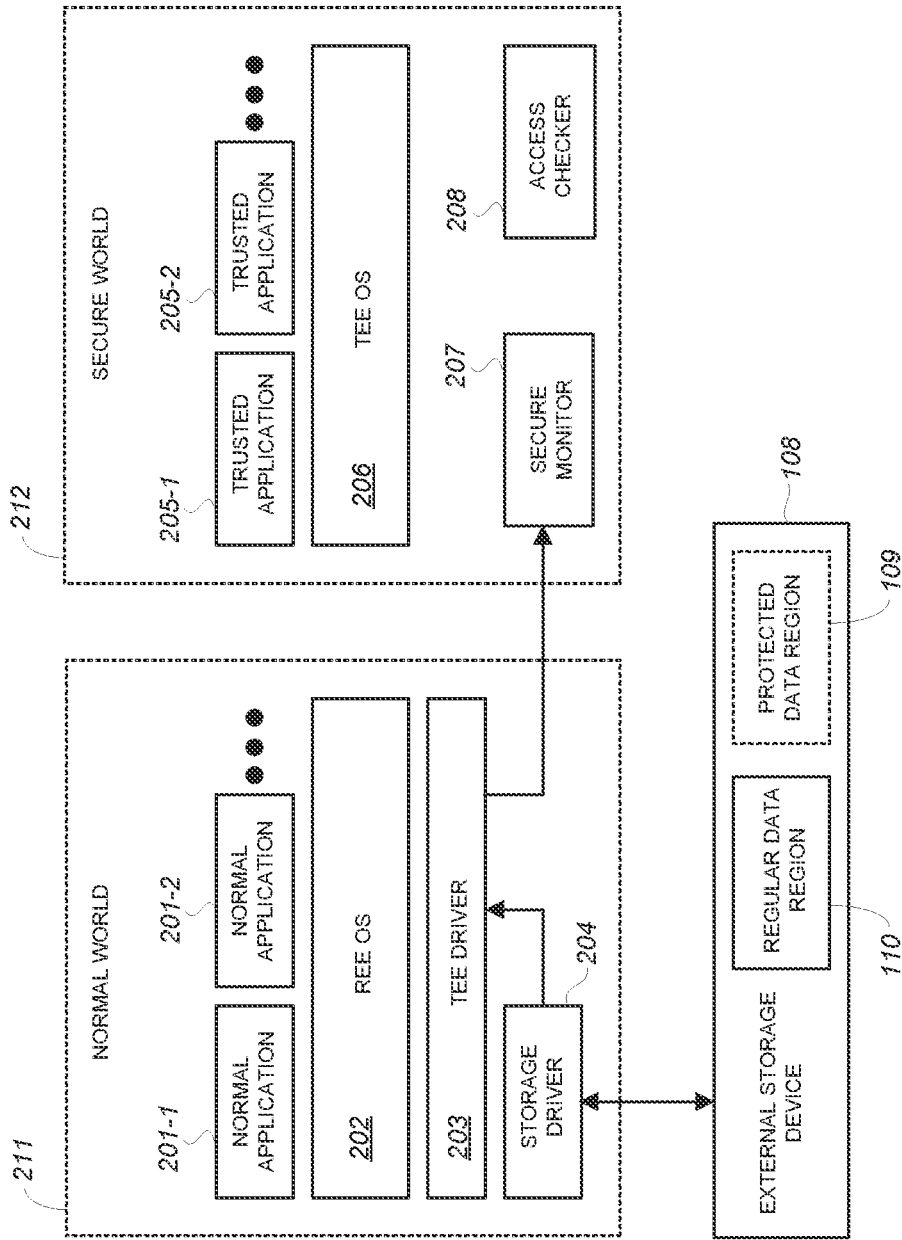
FIG. 2 shows a logical diagram of the computer system of FIG. 1, from a software point of view, in accordance with an embodiment of the present invention.

FIG. 2 shows a logical diagram of the computer system 100 from a software point of view, in accordance with an embodiment of the present invention. FIG. 2 shows the programs running in the normal world (labeled as 211) and in the secure world (labeled as 212).

In the example of FIG. 2, running in the normal world are normal application programs 201 (i.e., 201-1, 201-2, . . . ), a REE OS 202, a TEE driver 203, and a storage driver 204.

The TEE driver 203 is configured to allow communication between the normal world and the secure world. In one embodiment, the TEE driver 203 uses a Secure Monitor Call (SMC) instruction to communicate with the secure monitor 207, which is in the secure world.

The storage driver 204 is the device driver for the external storage device 108. In one embodiment, the SHIC 104 is configured to operate in the normal world and in the secure world. This allows the storage driver 204 to communicate with the SHIC 104. In the example of FIG. 2, there is no storage driver for the external storage device 108 in the secure world.

In the example of FIG. 2, running in the secure world are trusted application programs 205 (i.e., 205-1, 205-2, . . . ), a TEE OS 206, the secure monitor 207, and an access checker 208.

The secure monitor 207 is a conventional secure monitor for the TRUSTZONE technology. The access checker 208 is configured to check and validate instructions that originate from the normal world to access the protected data region 109. In one embodiment, the access checker 208 validates a secure monitor call by verifying a trusted agent identifier (ID) of a program in the normal world that performed or initiated the secure monitor call. The access checker 208 is configured to report (e.g., record in a log or raise an alert) all secure monitor calls to access the protected data region 109. The access checker 208 blocks unauthorized access to the protected data region 109. In one embodiment, the access checker 208 also validates access to the regular data region 110.

Figure 3:
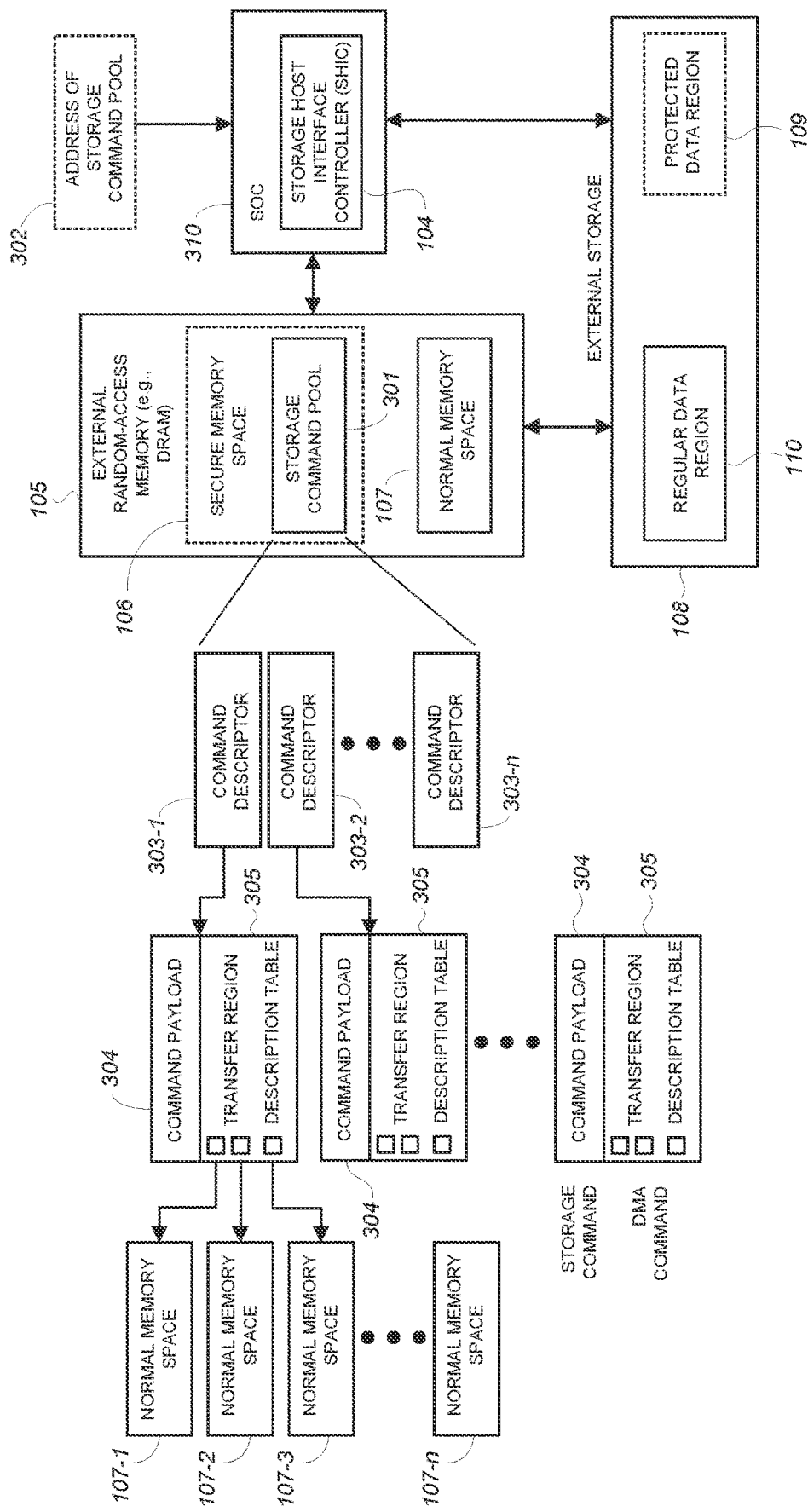
FIG. 3 shows a logical diagram of the contents of an external random-access memory of the computer system of FIG. 1, in accordance with an embodiment of the present invention.

FIG. 3 shows a logical diagram of the contents of the external RAM 105 in accordance with an embodiment of the present invention. The external RAM 105 has the secure memory space 106 and the normal memory space 107. A storage command pool 301 is stored in the secure memory space 106. The storage command pool 301 comprises a plurality of commands that when executed transfer data to or from the protected data region 109 or the regular data region 110 by DMA. Only one storage command pool 301 is shown in FIG. 3 for clarity of illustration. A plurality of storage command pools 301, one for each data transfer purpose, may be stored in the secure memory space 106. Because the secure memory space 106 is only accessible in the secure world, the storage command pools 301 are protected from tampering by unauthorized programs in the normal world.

In the example of FIG. 3, a storage command pool 301 comprises a series of command descriptors 303 (i.e., 303-1, 303-2, . . . , 303-n) for transferring data between the normal memory space and the external storage device 108 (protected data region 109 or the regular data region 110), with each command descriptor 303 comprising a storage command 304 and a DMA command 305.

The storage command 304, also referred to as a command payload, specifies locations in the external storage device 108. The DMA command 305 that corresponds to the storage command 304 includes a transfer region and a description table that specify locations in the normal memory space 107. The storage command 304 and the DMA command 305 map locations in the external storage device 108 to corresponding locations in the normal memory space 107. When the command descriptor 303 is executed, data is transferred between specified locations in the normal memory space 107 and specified locations in the external storage device 108 as indicated by the transfer region and description table of the DMA command 305 and the command payload 304. As a particular example, in the case where the command descriptor 303-1 is executed, data is transferred between the external storage device 108 and the normal memory spaces 107-1, 107-2, and 107-3 by DMA. As can be appreciated, because the data transfer is by DMA and validated by the access checker 208 in the secure world, any access to the protected data region 109 could be reported or rejected if unauthorized. This simplifies the monitoring of data transfer between the protected data region 109 and the normal memory space 107.

A storage command pool 301 may comprise a series of command descriptors 303 for transferring data from the external storage device 108 to corresponding locations in the normal memory space 107 or vice versa. A storage command pool 301 may be transferred from the normal world to the secure world by way of the storage driver 204. More particularly, the storage driver 204 in the normal world may pass the storage command pool 301 to a trusted application program 205 in the secure world by way of a secure monitor call. The trusted application program 205, after the secure monitor call is validated by the access checker 208 in the case where the access is to the protected data region 109, stores the storage command pool 301 in the secure memory space 106. The address (see FIG. 3, 302) of the storage command pool 301 in the secure memory space 106 may be stored in a secure location in the secure world, which in one embodiment is one or more secure registers of the SHIC 104. Being in the secure world, the address of the storage command pool 301 in the secure registers of the SHIC 104 is protected from tampering by unauthorized programs in the normal world. To move data between the external storage device 108 and the normal memory space 107, the SHIC 104 (which can operate in the secure world) fetches the storage command pool 301 from the secure memory space 106 and starts a DMA operation in accordance with the storage command pool 301.

For example, a storage command pool 301 may comprise a series of command descriptors 303 for transferring firmware platform from the protected data region 109 to corresponding locations in the normal memory space 107. Once the firmware platform has been transferred to the normal memory space 107 by DMA (by executing the storage command pool 301), the platform firmware can be transferred to other locations.

As another example, a storage command pool 301 may comprise a series of command descriptors 303 for transferring platform firmware from the normal memory space 107 to the protected data region 109. The platform firmware may be placed in the normal memory space 107 and thereafter transferred to the protected data region 109 by DMA by executing the storage command pool 301.

Figure 4:
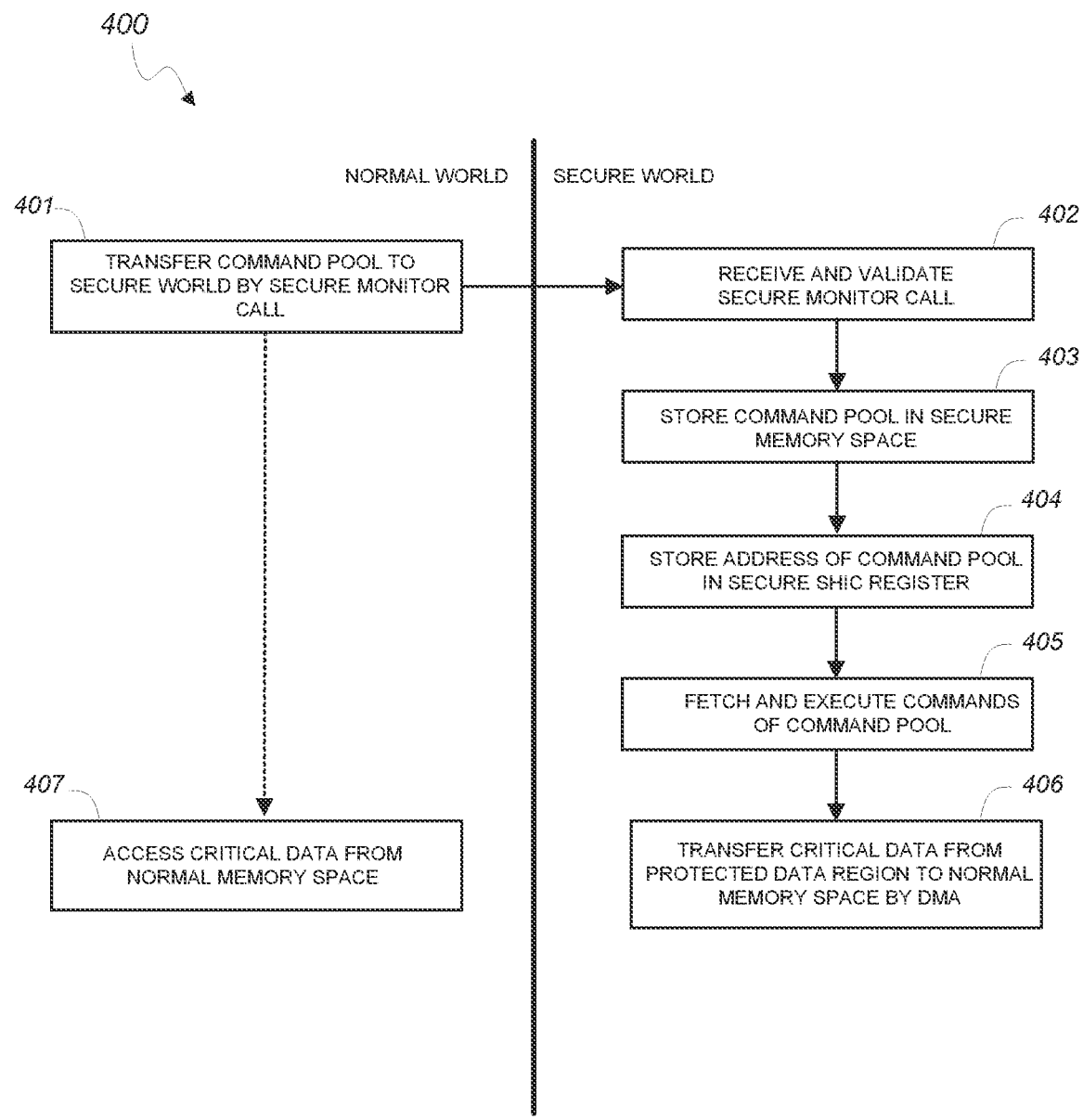
FIG. 4 shows a flow diagram of a method of securing critical data in a storage device in accordance with an embodiment of the present invention.

FIG. 4 shows a flow diagram of a method 400 of securing critical data in a storage device in accordance with an embodiment of the present invention. The method 400 is explained with reference to FIGS. 1-3 for illustration purposes only. As can be appreciated, other components may also be employed without detracting from the merits of the present invention.

In the method 400, critical data has been stored in the protected data region 109 of the external storage device 108. The method 400 transfers the critical data from the protected data region 109 to the normal memory space 107.

In the method 400, steps on the left side are performed in the normal world, whereas steps on the right side are performed in the secure world. In step 401, a storage command pool 301 for transferring the critical data from the protected data region 109 to the normal memory space 107 is transferred by the storage driver 204 to a trusted application program 205 by making a secure monitor call by way of the TEE driver 203. The transfer of the storage command pool 301 to the secure world may be initiated by an authorized normal application program 201 that needs to read the critical data.

In step 402, the secure monitor call from the normal world is received by the secure monitor 207 in the secure world. The secure monitor 207 passes the secure monitor call to the access checker 208 for validation. The access checker 208 checks the identifier that accompanies the secure monitor call to ensure that the secure monitor call is from an authorized program in the normal world. That is, the validation of the secure monitor call is performed before and as a condition to performing a DMA operation to access the protected data region 109. The access checker 208 prevents the access to the protected data region 109 if the secure monitor call fails validation.

In step 403, if the secure monitor call is from an authorized program in the normal world, the access checker 208 allows the secure monitor call to proceed. In response, the associated trusted application program 205 in the secure world stores the storage command pool 301 in the secure memory space 106. In step 404, the trusted application program 205 stores, in a secure register of the SHIC 104, the address of the storage command pool 301 in the secure memory space 106. In step 405, the SHIC 104 fetches the commands of the storage command pool 301 from the secure memory space 106 and executes them. In step 406, the critical data is transferred from the protected data region 109 to the normal memory space 107 by DMA in accordance with the command descriptors 303 of the storage command pool 301. In step 407, in the normal world, the critical data may thereafter be accessed from the normal memory space 107 for transfer to other location in the normal world.

Figure 5:
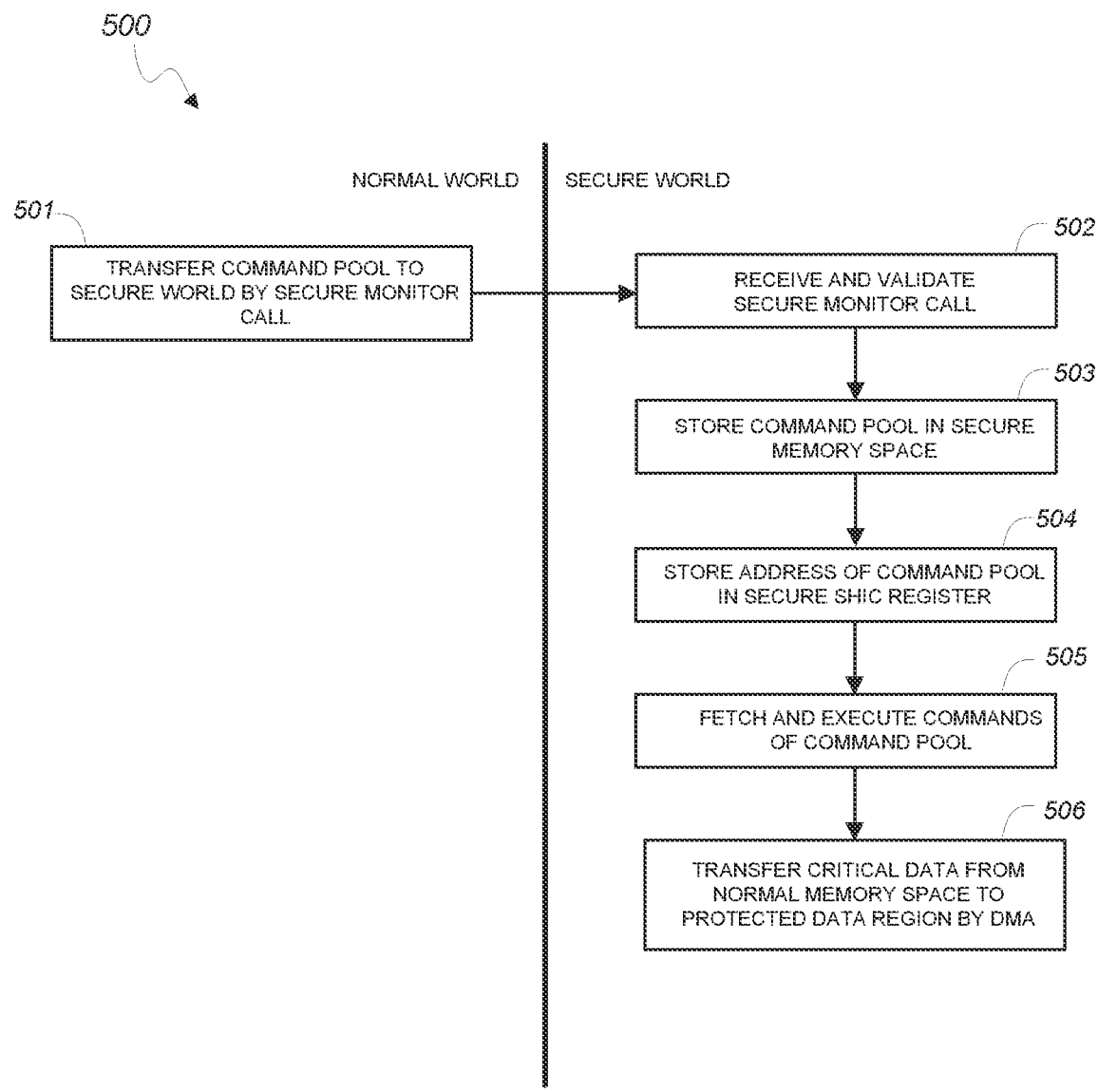
FIG. 5 shows a flow diagram of a method of securing critical data in a storage device in accordance with another embodiment of the present invention.

FIG. 5 shows a flow diagram of a method 500 of securing critical data in a storage device in accordance with an embodiment of the present invention. The method 500 is explained with reference to FIGS. 1-3 for illustration purposes only. As can be appreciated, other components may also be employed without detracting from the merits of the present invention.

In the method 500, critical data has been stored in the normal memory space 107 of the external RAM 105. The method 500 transfers the critical data from the normal memory space 107 to the protected data region 109 of the external storage device 108.

In the method 500, steps on the left side are performed in the normal world, whereas steps on the right side are performed in the secure world. In step 501, a storage command pool 301 for transferring the critical data from the normal memory space 107 to the protected data region 109 is transferred by the storage driver 204 to a trusted application program 205 by making a secure monitor call by way of the TEE driver 203. The transfer of the storage command pool 301 to the secure world may be initiated by an authorized normal application program 201 that needs to securely store the critical data.

In step 502, the secure monitor call from the normal world is received by the secure monitor 207 in the secure world. The secure monitor 207 passes the secure monitor call to the access checker 208 for validation. The access checker 208 checks the identifier that accompanies the secure monitor call to ensure that the secure monitor call is from an authorized program in the normal world. That is, the validation of the secure monitor call is performed before and as a condition to performing a DMA operation to access the protected data region 109. The access checker 208 prevents the access to the protected data region 109 if the secure monitor call fails validation.

In step 503, if the secure monitor call is from an authorized program in the normal world, the access checker 208 allows the secure monitor call to proceed. In response, the associated trusted application program 205 in the secure world stores the storage command pool 301 in the secure memory space 106. In step 504, the address of the storage command pool 301 in the secure memory space 106 is stored by the trusted application program 205 in a secure register of the SHIC 104. In step 505, the SHIC 104 fetches the commands of the storage command pool 301 from the secure memory space 106 and executes them. In step 506, the critical data is transferred from the normal memory space 107 to the protected data region 109 by DMA in accordance with the command descriptors 303 of the storage command pool 301.

Embodiments of the present invention provide advantages heretofore unrealized. First, the embodiments provide security features to UFS devices, allowing UFS devices to be used to store critical data, such as platform firmware. Second, the embodiments allow an external storage device with a storage driver in the normal world to store critical data in a protected data region without the need to have a storage driver in the secure world. Third, the embodiments allow an external storage device with a storage driver in the normal world to secure critical data in the external storage device without having to constantly monitor data transfer to and from the external storage device in the normal world.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of securing critical data in a computer system that comprises a system on a chip (SOC) with a Reduced Instruction Set Computer (RISC) processor core that operates in a normal world and a secure world, the RISC processor core providing hardware-level isolation between the normal world and the secure world, the method comprising:
   providing an external storage device that is external to the SOC;
   storing the critical data in a protected data region of the external storage device;
   storing a storage command pool in a secure memory space in the secure world, the secure world being a Trusted Execution Environment (TEE) and the normal world being a Rich Execution Environment (REE);
   making a secure monitor call from the normal world to the secure world;
   validating the secure monitor call in the secure world; and
   in response to the secure monitor call passing validation in the secure world, performing a direct memory access (DMA) operation in the secure world in accordance with the storage command pool to transfer the critical data between the protected data region of the external storage device and a normal memory space in an external random-access memory (RAM) of the computer system, the normal memory space being accessible in the normal world, the external RAM being external to the SOC.

2. The method of claim 1, wherein the RISC processor core is an ARM processor core.

3. The method of claim 1, wherein the external storage device is a Universal Flash Storage (UFS) device.

4. The method of claim 1, further comprising:
   reporting receipt of the secure monitor call in the secure world.

5. The method of claim 1, wherein the storage command pool is stored in the secure memory space of the external RAM.

6. The method of claim 5, wherein performing the DMA operation comprises:
   in the secure world, fetching and executing a plurality of commands of the storage command pool from the secure memory space to perform the DMA operation to transfer the critical data between the protected data region and the normal memory space.

7. The method of claim 6, further comprising:
   storing an address of the storage command pool in a secure register of a storage host interface controller (SHIC) that is internal to the SOC, wherein the external storage device is connected to and is controlled by the SHIC.

8. A computer system comprising:
   a Reduced Instruction set Computer (RISC) processor that operates in a normal world and a secure world, the RISC processor providing hardware-level isolation between the normal world and the secure world, the RISC processor being connected to a system bus of the computer system;
   a storage host interface controller (SHIC) that is connected to the system bus;
   a storage device that is connected to the SHIC, the storage device having a protected data region that stores critical data; and a dynamic random-access memory (DRAM) having a normal memory space accessible in the normal world and a secure memory space that is accessible only in the secure world, the DRAM being connected to the system bus, the secure memory space storing a storage command pool that comprises a plurality of commands for transferring the critical data between the protected data region and the normal memory space by direct memory access (DMA).

9. The computer system of claim 8, wherein the computer system includes, in the normal world but not in the secure world, a storage driver for controlling the storage device.

10. The computer system of claim 8, wherein the RISC processor and the SHIC are integrated in a system on a chip (SOC), and the storage device and the DRAM are external to the SOC.

11. The computer system of claim 8, wherein the RISC processor is an ARM processor.

12. The computer system of claim 8, wherein the storage device is a Universal Flash Storage (UFS) device.

13. The computer system of claim 8, wherein the critical data comprises platform firmware of the computer system.

14. The computer system of claim 8, wherein the SHIC is operable in the normal world and in the secure world.

15. The computer system of claim 14, wherein an address of the storage command pool is stored in secure registers of the SHIC, the secure registers of the SHIC being accessible only in the secure world.

* * * * *